US008424767B2

(12) United States Patent
Barkan et al.

(10) Patent No.: US 8,424,767 B2
(45) Date of Patent: Apr. 23, 2013

(54) AUTO-EXPOSURE FOR MULTI-IMAGER BARCODE READER (75) Inventors: Edward D. Barkan, Miller Place, NY (US); Bradley S. Carlson, Huntington, NY (US); Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/411,815

(22) Filed: Mar. 5, 2012

(65) Prior Publication Data

US 2012/0160917 A1    Jun. 28, 2012

Related U.S. Application Data (63) Continuation of application No. 12/417,287, filed on Apr. 2, 2009, now Pat. No. 8,146,821.

(51) Int. Cl.
G03B 7/08 (2006.01)
G06K 5/00 (2006.01)
G06K 7/10 (2006.01)
G06K 7/14 (2006.01)
G06K 15/12 (2006.01)
G08C 21/00 (2006.01)

(52) U.S. Cl.
USPC .. 235/462.24; 235/455; 235/454; 235/462.06; 235/462.41; 235/462.42

(58) Field of Classification Search ............... None
See application file for complete search history.

(56) References Cited

U.S. PATENT DOCUMENTS

| 4,613,895 | A | 9/1986 | Burkey et al. |
| 4,794,239 | A | 12/1988 | Allais |
| 4,818,856 | A | 4/1989 | Matsushima et al. |
| 5,059,779 | A | 10/1991 | Krichever et al. |
| 5,124,539 | A | 6/1992 | Krichever et al. |
| 5,200,599 | A | 4/1993 | Krichever et al. |
| 5,304,786 | A | 4/1994 | Pavlidis et al. |
| 5,331,142 | A | 7/1994 | Takenaka |

(Continued)

FOREIGN PATENT DOCUMENTS

WO    2006062818 A2    6/2006

OTHER PUBLICATIONS

International Preliminary Report on Patentability for International Application No. PCT/US2010/029001 mailed on Oct. 13, 2011.

(Continued)

*Primary Examiner* — Daniel Walsh (57) ABSTRACT

A bar code reader 10 includes a housing 20 including one or more transparent windows H, V and defining a housing interior region. As a target object is swiped or presented in relation to the transparent windows an image of the target object is captured. Cameras C1-C6 have an image capture sensor array with a global shutter is positioned within the housing interior region for capturing an image of a bar code within a camera field of view. All the cameras produce images in a sequential manner during an image frame time period. An image processing system has a processor for decoding a bar code carried by the target object. The processing system responds to signals from a light sensor to terminate object illumination when an adequate image exposure has transpired.

19 Claims, 6 Drawing Sheets

U.S. PATENT DOCUMENTS

| | | | |
|---|---|---|---|
| 5,510,607 | A | 4/1996 | Ishikawa |
| 5,559,562 | A | 9/1996 | Ferster |
| 5,703,349 | A | 12/1997 | Meyerson et al. |
| 5,717,195 | A | 2/1998 | Feng et al. |
| 5,869,827 | A | 2/1999 | Rando |
| 6,065,678 | A | 5/2000 | Li et al. |
| 6,141,062 | A | 10/2000 | Hall et al. |
| 6,189,795 | B1 | 2/2001 | Ohkawa et al. |
| 6,296,187 | B1 | 10/2001 | Shearer |
| 6,924,807 | B2 | 8/2005 | Ebihara et al. |
| 7,076,097 | B2 | 7/2006 | Kondo et al. |
| 7,116,353 | B2 | 10/2006 | Hobson et al. |
| 7,191,947 | B2 | 3/2007 | Kahn et al. |
| 7,280,124 | B2 | 10/2007 | Laufer et al. |
| 7,296,744 | B2 * | 11/2007 | He et al. ................ 235/454 |
| 7,344,080 | B2 | 3/2008 | Vinogradov et al. |
| 7,357,325 | B2 | 4/2008 | Zhu et al. |
| 7,430,682 | B2 | 9/2008 | Carlson et al. |
| 7,527,207 | B2 | 5/2009 | Acosta et al. |
| 7,757,955 | B2 | 7/2010 | Barkan |
| 7,823,787 | B2 * | 11/2010 | He et al. ............. 235/462.42 |
| 8,146,821 | B2 * | 4/2012 | Barkan et al. ........ 235/462.24 |
| 2001/0042789 | A1 | 11/2001 | Krichever et al. |
| 2002/0038820 | A1 | 4/2002 | Check et al. |
| 2002/0056750 | A1 | 5/2002 | Kato et al. |
| 2002/0125317 | A1 | 9/2002 | Hussey et al. |
| 2002/0179713 | A1 | 12/2002 | Pettinelli et al. |
| 2003/0029915 | A1 | 2/2003 | Barkan et al. |
| 2003/0090805 | A1 | 5/2003 | Ohkawa et al. |
| 2004/0146211 | A1 | 7/2004 | Knapp et al. |
| 2005/0259746 | A1 | 11/2005 | Shinde et al. |
| 2006/0022051 | A1 | 2/2006 | Patel et al. |
| 2006/0118627 | A1 | 6/2006 | Joseph et al. |
| 2006/0118628 | A1 | 6/2006 | He et al. |
| 2007/0079029 | A1 | 4/2007 | Carlson et al. |
| 2007/0176003 | A1 | 8/2007 | Brock |
| 2008/0105745 | A1 | 5/2008 | Lei |
| 2008/0179402 | A1 | 7/2008 | Barkan et al. |
| 2009/0020611 | A1 | 1/2009 | Sackett et al. |
| 2009/0020612 | A1 | 1/2009 | Drzymala et al. |
| 2009/0026271 | A1 | 1/2009 | Drzymala et al. |
| 2009/0078775 | A1 | 3/2009 | Giebel et al. |
| 2009/0084854 | A1 | 4/2009 | Carlson et al. |
| 2009/0101719 | A1 | 4/2009 | Knowles et al. |
| 2009/0159683 | A1 | 6/2009 | Roquemore et al. |
| 2009/0206161 | A1 | 8/2009 | Olmstead |
| 2009/0272810 | A1 | 11/2009 | Barkan |
| 2010/0019042 | A1 | 1/2010 | Barkan |
| 2010/0019043 | A1 | 1/2010 | Sackett et al. |
| 2010/0102129 | A1 | 4/2010 | Drzymala et al. |
| 2010/0116887 | A1 | 5/2010 | Barkan et al. |
| 2010/0147953 | A1 | 6/2010 | Barkan |
| 2010/0155484 | A1 | 6/2010 | Gregerson |
| 2010/0187313 | A1 | 7/2010 | He et al. |
| 2010/0200656 | A1 | 8/2010 | Marshall et al. |
| 2010/0252633 | A1 * | 10/2010 | Barkan et al. ........ 235/462.24 |
| 2010/0252635 | A1 | 10/2010 | Drzymala et al. |
| 2011/0024505 | A1 | 2/2011 | Wang et al. |
| 2011/0127333 | A1 | 6/2011 | Veksland et al. |

OTHER PUBLICATIONS

International Search Report and Written Opinion for International Application No. PCT/US2010/029001 mailed on Aug. 20, 2010.

Non Final Office Action mailed Jun. 24, 2011 in counterpart U.S. Appl. No. 12/417,287, filed Apr. 2, 2009.

Notice of Allowance mailed Dec. 21, 2011 in counterpart U.S. Appl. No. 12/417,287, filed Apr. 2, 2009.

* cited by examiner

AUTO-EXPOSURE FOR MULTI-IMAGER BARCODE READER

RELATED APPLICATIONS

This application is a continuation of U.S. patent application Ser. No. 12/417,287, field Apr. 2, 2009, titled "AUTO-EXPOSURE FOR MULTI-IMAGER BARCODE READER."

FIELD OF THE INVENTION

The present invention relates to a bar code reader having several cameras that are positioned within a housing for viewing objects moving past one or more windows to determine the content of bar codes on the objects.

BACKGROUND OF THE INVENTION

A bar code is a coded pattern of graphical indicia having a series or pattern of bars and spaces of varying widths that encode information. Bar codes may be one dimensional (e.g., UPC bar code) or two dimensional (e.g., DataMatrix bar code). Systems that read, that is, image and decode bar codes employing imaging camera systems are typically referred to as imaging-based bar code readers or bar code scanners.

Imaging-based bar code readers may be portable or stationary. Stationary bar code readers are mounted in a fixed position and a target object, e.g., a product package that includes a target bar code, is moved or swiped past a transparent window so the object passes through a field of view of the stationary bar code reader. The bar code reader typically provides an audible and/or visual signal to indicate the target bar code has been successfully imaged and decoded.

A typical example where a stationary imaging-based bar code reader would be utilized includes a point of sale counter/cash register where customers pay for their purchases. The bar code reader is typically enclosed in a housing that is installed in a counter and normally includes a vertically oriented transparent window and/or a horizontally oriented transparent window, either of which may be used for reading the target bar code affixed to the target object, i.e., the product or product packaging. The sales person (or customer in the case of self-service check out) sequentially presents each target object's bar code either to the vertically oriented window or the horizontally oriented window, whichever is more convenient given the specific size and shape of the target object and the position of the bar code on the target object.

A stationary imaging-based bar code reader that has a plurality of imaging cameras can be referred to as a multi-camera imaging-based scanner or bar code reader. In a multi-camera imaging reader, each camera system typically is positioned so that it has a different field of view from every other camera system. While the fields of view may overlap to some degree, the effective or total field of view of the reader is increased by adding additional camera systems. Hence, the desirability of multi-camera readers as compared to single camera bar code readers which have a smaller effective field of view and require presentation of a target bar code to the reader in a very limited orientation to obtain a successful, decodable image.

If several imaging cameras are positioned to look out of the bar code reader's window or windows in different directions, the bar code reader can decode barcodes on various sides of packages that are swiped through the multiple, overlapping fields of view. Swiping promotes higher throughput and also assures that all the cameras have the opportunity to see their respective sides of a package, which may not happen if the package is stationary. Existing laser-based supermarket scanners are designed to handle swipe speeds up to 100 inches per second. With this high swipe speed, the barcode may only be within the field of view of any given camera for a single camera exposure frame, so it becomes important that the single frame be properly exposed, or the barcode might not be decodable.

One way to accommodate signal variations due to barcode distance and window composition is to use an auto-exposure system. Many camera image sensors include internal auto-exposure circuitry. This circuitry measures the level of light that is received on one frame and adjusts exposure duration on the next subsequent frame based on measurements taken on the first image or first frame. The result is that the exposure of the first frame may not be adequate to decode a barcode image but that the second captured frame should produce a decodable image.

Such adjustments are acceptable for some image readers, such as handheld bar code readers where the barcode remains stationary in front of the reader for several frame durations. Such an adjustment is not acceptable, however, where the user swipes the barcode rapidly through a field of view of the camera (or cameras) of a barcode reader. When swipe speed is high, the barcode can pass through the field of view before a second frame can be captured so it is important that the first frame captured be of the proper exposure for bar code interpretation.

U.S. Pat. No. 7,357,325 discusses an 'Automatic Light Exposure Measurement and Illumination Control Subsystem' that utilizes a rolling shutter with a single camera. It measures, in real-time, a power density [joules/em] of photonic energy (i.e. light) collected by the optics of the system at its image sensing array and generates Auto-Exposure Control Signals indicating the amount of exposure required for good image formation and detection. The system of this patent uses an optical band pass filter in the imaging system. An optical filter is needed with a rolling shutter since parts of the sensor will be exposing for long periods of time when the illumination is turned off, so these parts would provide blurred images if ambient light illuminated a moving barcode during that period.

Global shutters for use with imaging barcode readers and scan engines are known. The duration of the illumination matches or exceeds the integration or exposure time. Some global shutter scanners activate the illumination only during the integration time while others have the illumination activated continuously.

SUMMARY OF THE INVENTION

A real-time auto-exposure system for a bar code reader having multiple imagers is disclosed wherein a number of imagers or cameras use a global shutter sensor. Imaging sensors having global shutters can expose the sensor for a small portion of an overall image capture frame time. This capability allows the illumination systems of different cameras of the multiple camera system to flash, without interference. In the disclosed system, multiple global shutter sensors are programmed to operate at the longest exposure time that is anticipated to be necessary for the scanning application. For example, the programmed exposure time would be adequate to decode a barcode at the maximum required working range, assuming that the reader's illumination system is illuminated for that entire exposure time.

The disclosed system makes optimum use of a limited number of captured image frames. It allows the camera sensor to operate at a minimum number of frames per second since every image will be properly exposed. Auto exposure systems that can't assure proper exposure until a second frame, for example, will need to be operated at a higher frame rate to avoid missing a rapidly moving barcode. Sensors that operate at higher frame rates are more expensive, and the higher frame rate will place more of a load on the decoder, increasing its cost and power consumption.

The exposure time of the disclosed bar code reader is fast enough that it ends before the next camera flashes. For example, consider a bar code reader that has six cameras each operating at 60 frames/second. This allows each camera up to 2.7 ms exposure time before the next camera flashes, so each camera must use an exposure that is shorter than 2.7 ms. (6×23=16.4 ms×60 frames=984 ms) Exposure times of less than 500 microseconds can be achieved with a global shutter, so there is no chance that one camera will still be imaging when the next one flashes.

The disclosed system yields advantages not achievable by using a rolling shutter system and also not achievable when illuminating fields of view continuously during an entire integration time. In particular, a rolling shutter cannot be used in a scanner with multiple imagers each of which have their own illumination systems, and where the multiple cameras flash in succession in fractions of a frame time. If rolling shutters were used the image from one camera would be corrupted by flashes from another, since the rolling shutter would leave at least part of the frame exposing for an extended period of time, including when another of the cameras flashes its light. Since the fields of view overlap, each imager must end its exposure before the next one flashes so it is not influenced by the light projected by the other camera.

These and other objects, advantages, and features of the exemplary embodiment of the invention are described in detail in conjunction with the accompanying drawings.

DETAILED DESCRIPTION

Figure 1:
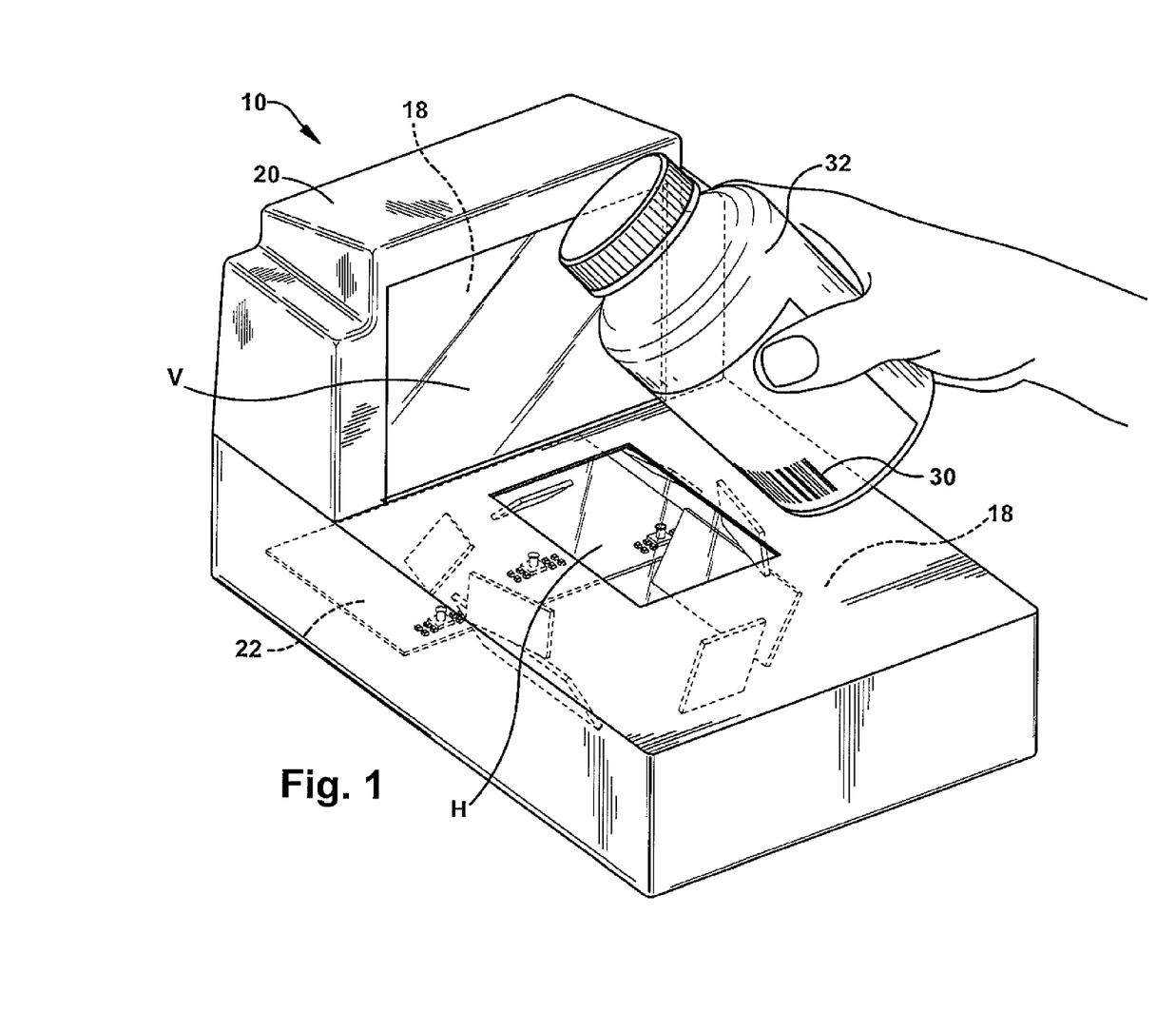
FIG. 1 is a perspective view of a bar code reader having a vertical and a horizontal window through which bar codes are viewed by multiple cameras within the reader constructed in accordance with one example embodiment of the present disclosure.
Figure 2:
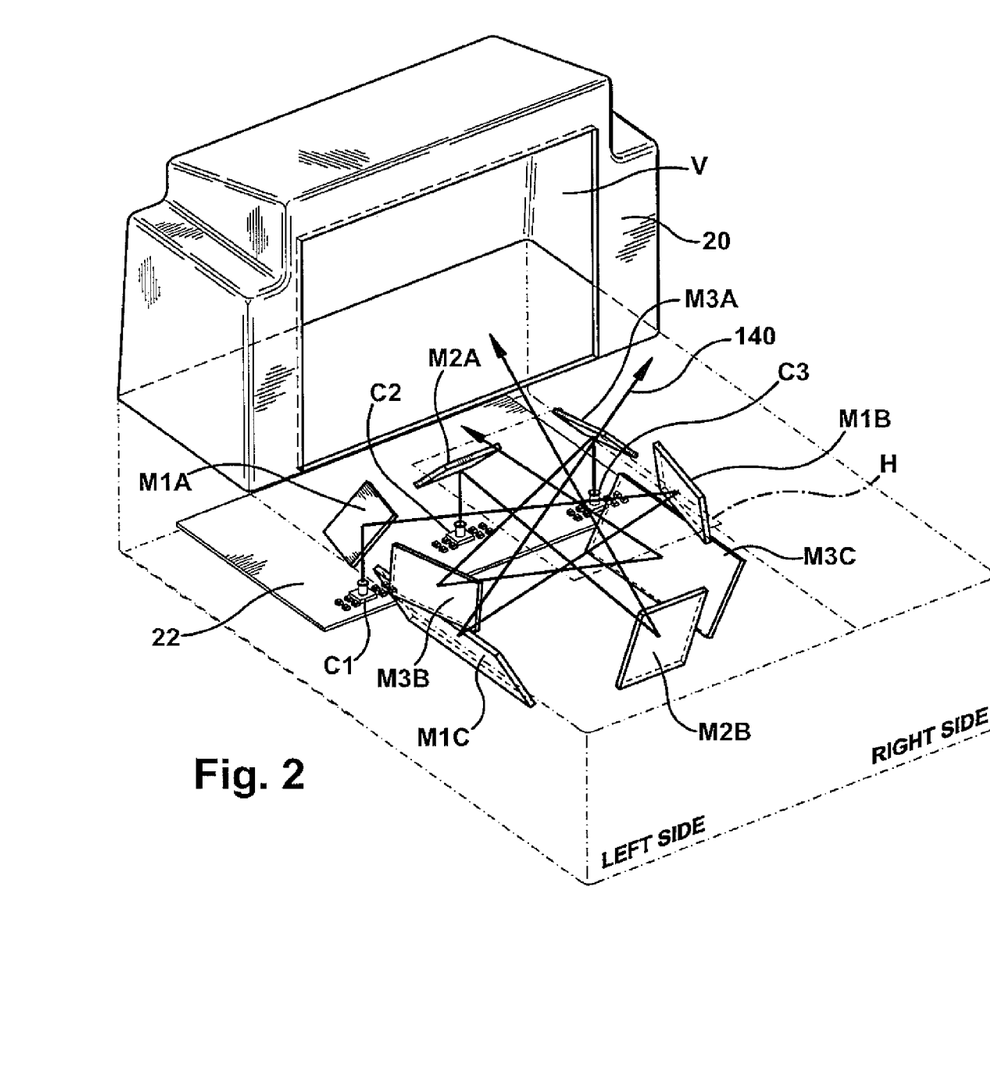
FIG. 2 is a perspective view of the reader of FIG. 1 with a portion of the reader housing removed to illustrate three cameras forming a portion of a plurality of cameras located on a printed circuit board.

FIG. 2 depicts a stationary bar code reader 10 having an imaging and decoding system supported within an interior region 18 of a housing 20. The housing 20 may be integrated into a sales counter of a point of sales system that includes, for example, a cash register, a touch screen visual display or other type user interface and a printer for generating sales receipts. The housing 20 depicted in FIG. 1 includes two transparent windows H, V so that objects moved past the housing can be imaged.

In accordance with one use, either a sales person or a customer will swipe a product or target object 32 selected for purchase relative to the housing 20. A target bar code 30 imprinted or affixed to the target object 32 is swiped through a region near the windows H, V for reading, that is, imaging and decoding of the coded indicia of the target bar code.

Imaging Optics

An exemplary imaging system 12 has six cameras C1-C6 that capture a series of image frames in a programmable way under the control of a processor or processors 15. The series of image frames for each camera assembly C1-C6 is shown schematically as IF1, IF2, IF3, IF4, IF5, IF6 in FIG. 5. Each series of image frames IF1-IF6 comprises a sequence of individual image frames generated by the respective cameras C1-C6 at times controlled by the processors 15. The designation IF1, for example, represents multiple successive images obtained from the camera C1.

Figure 5:
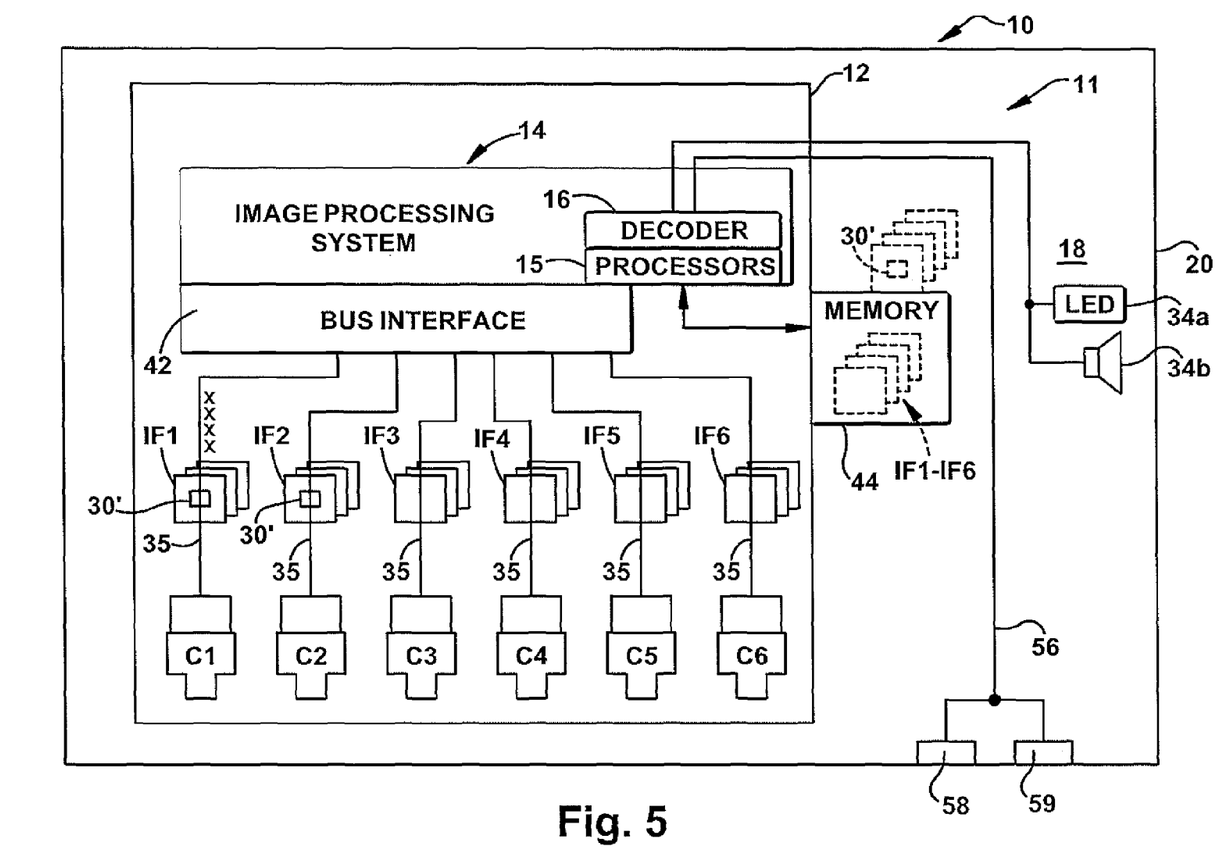
FIG. 5 is a schematic block diagram of selected systems and electrical circuitry of the bar code reader of FIG. 1.

Digital signals 35 that make up the frames are coupled to a bus interface 42, where the signals are multiplexed and then communicated to a memory 44 in an organized fashion so that the processor knows which image representation belong to a given camera. Image processors 15 access the image frames IF1-IF6 from memory 44 and search for image frames that include an imaged target bar code 30'. If the imaged target bar code 30' is present and decodable in one or more image frames, a decoder 16 attempts to decode the imaged target bar code 30' using one or more of the image frames having the imaged target bar code 30'.

Each of the cameras has a two-dimensional (2D) CMOS image capture array with a typical size of the pixel array being on the order of 752×480 pixels. The illumination-receiving pixels of the sensor array define a sensor array surface secured to a printed, circuit board for stability. The sensor array surface is substantially perpendicular to an optical axis of the imaging lens assembly, that is, an axis that is perpendicular to the sensor array surface would be substantially parallel to the optical axis of the focusing lens. The pixels of the sensor array surface are disposed in an orthogonal arrangement of rows and columns of pixels.

A rolling shutter in a CMOS image sensor resets rows of pixels in sequence. As an example, the shutter starts at the top of the image and proceeds row by row to the bottom, resetting each row. When the reset process has moved some distance down the image, the readout process begins at the top. Rows of pixels are read out in sequence, starting at the top of the image and proceeding row by row to the bottom in exactly the same fashion and at the same speed as the reset process. The time delay between a row being reset and a row being read is the integration time. By varying the amount of time between when the reset sweeps past a row and when the readout of the row takes place, the integration time (hence the exposure) can be controlled for a sensor having a rolling shutter. Since the integration process moves through the image over some length of time, motion artifacts may occur and if a bar code is present on a moving object swiped in front of the reader, the bar code may not be decodeable.

A global shutter operates differently. When a global shutter is used, the entire image is reset before integration of the pixel contributions to the image. The pixels are allowed to accumulate charge during an integration time. At the end of the integration time, the accumulated charge in each pixel is simultaneously transferred to a light shielded storage area. Then the signals are read out from the light shielded area. Since all pixels are reset at the same time, integrated over the same interval, motion artifacts are avoided. A representative sensor having a global shutter is commercially available from Aptina (formerly Micron) under the part designation MT9V022.

Figure 8:
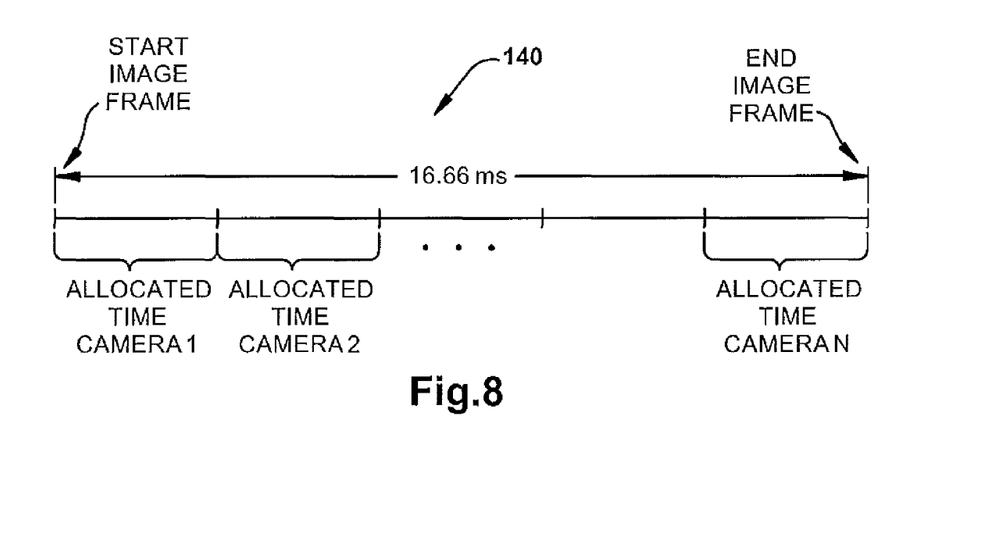
FIG. 8 is a frame sequence of exposure time slices for a bar code reader having multiple cameras.

An exemplary system uses one or more light emitting diodes closely spaced from an associated sensor array for each of the cameras C1-C6. The LEDs are selectively activated to emit light under control of the processors 15. This is shown more clearly in the schematic depiction of FIG. 8.

Decoding Images

As is best seen in FIG. 5, the digital signals 35 are received by a bus interface 42 of an image processing system 14, which serializes the image data contained in the digital signals 35. The digitized values of the digitized signal 35 are stored in the memory 44.

The decoding circuitry 14 performs a process on selected image frames by getting an image from memory and determining if the image has a bar code. If so, a decoder 16 attempts to decode any decodable image within the image frames, e.g., the imaged target bar code 30'. If the decoding is successful, decoded data 56, representative of the data/information coded in the target bar code 30 is then output via a data output port 58 and/or displayed to a user of the reader 10 via a display 59. Upon achieving a good read of the target bar code 30, that is, the bar code 30 was successfully imaged and decoded, a speaker 34b and/or an indicator LED 34a is activated by the bar code reader circuitry 11 to indicate to the user that the target bar code 30 has been successfully read.

Multiple Camera Fields of View

Referring now to FIG. 2, an exemplary dual window bar code reader includes a printed circuit board 22 that supports six imaging cameras. Three cameras having a field-of-view extending from a generally horizontal window H are shown, namely C1, C2, and C3. Camera or imager C1 and its associated optics faces generally vertically upward toward an inclined folding mirror M1A substantially directly overhead at a left side of the horizontal window H. The folding mirror M1A faces another inclined narrow folding mirror M1B located at a right side of the horizontal window H. The folding mirror M1B faces still another inclined wide folding mirror M1C adjacent the mirror M1A, The folding mirror M1C faces out through the generally horizontal window H toward the right side of the dual window scanner. A region of imaging coverage resulting from the field-of-view projected from camera C1 is produced, substantially filling a scanning area of the horizontal window H.

The camera or imager C3 and its associated optics are symmetric with respect to a center line of the reader to imager C1. Camera C3 faces generally vertically upward toward an incline folding mirror M3A substantially directly overhead at a right side of the horizontal window H. The folding mirror M3A faces another inclined narrow folding mirror M3B located at a left side of the horizontal window H. The folding mirror M3B faces still another inclined wide folding minor M3C adjacent the mirror M3A. The folding mirror M3C faces out through the generally horizontal window H toward the left side of the dual window reader.

Imager or camera C2 and its associated optics are located between imagers C1 and C3 and their associated optics, Imager C2 faces generally vertically upward toward an inclined folding mirror M2A substantially directly overhead generally centrally of the horizontal window H at one end thereof. The folding mirror M2A faces another inclined folding mirror M2B located at the opposite end of the horizontal window H. The folding mirror M2B faces out through the window H in an upward direction toward the vertical window V in the housing 20.

Figures 3, 4:
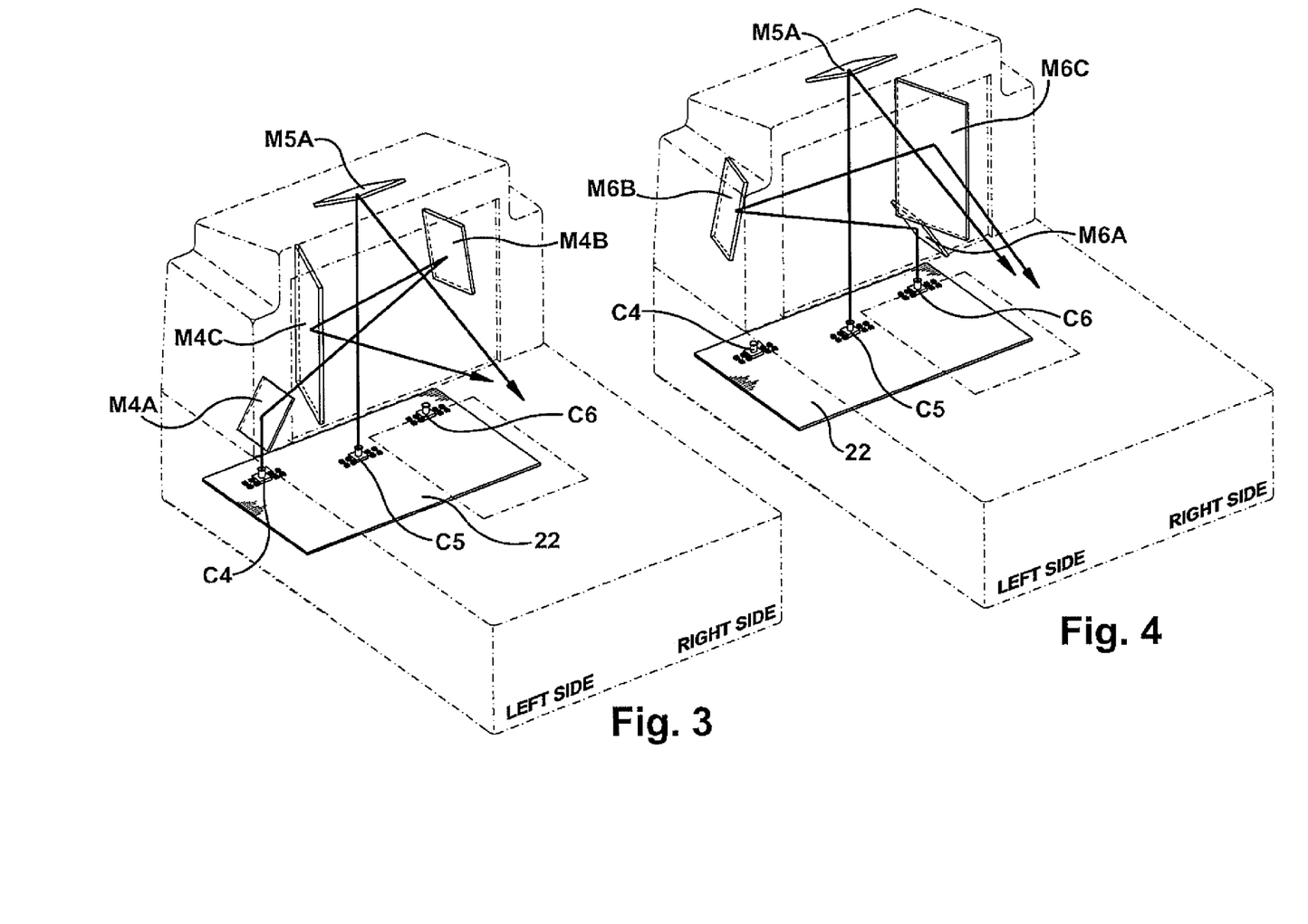
FIGS. 3 and 4 are perspective views showing a position of three additional cameras forming a portion of a plurality of cameras located on a printed circuit board resulting in a total of six cameras constructed in accordance with one example embodiment of the present disclosure.

As illustrated in FIG. 3, the dual window reader has a camera or imager C4 and its associated optics that faces generally vertically upward toward an incline folding mirror M4A substantially directly overhead at a left side of the vertical window V, The folding mirror M4A faces another inclined narrow folding mirror M4B located at a right side of the vertical window V. The folding mirror M4B faces still another inclined wide folding mirror M4C adjacent the mirror M4A. The folding mirror M4C faces out through the generally vertical window V toward the right side of the dual window reader.

In FIG. 4 camera or imager C6 and its associated optics is mirror symmetrical to imager C4. Camera C6 faces generally vertically upward toward an incline folding mirror M6A substantially directly overhead at a right side of the vertical window V. The folding mirror M6A faces another inclined narrow folding mirror M6B located at a left side of the vertical window V. The folding mirror M6B faces still another inclined wide folding mirror M6C adjacent the mirror M6A. The folding mirror M6C faces out through the generally vertical window V toward the left side of the dual window reader.

In FIG. 4, imager or camera C5 and its associated optics are located generally centrally between imagers C4 and C6 and their associated optics. Imager C5 faces generally vertically upward toward an inclined folding mirror M5A substantially directly overhead generally centrally of the vertical window V at one end thereof. The folding mirror M5A faces out through the window V in a downward direction toward the horizontal window H in the housing 20.

Features and functions of the fold mirrors shown in FIGS. 2-4 are described in further detail in U.S. patent application Ser. No. 12/245,111 to Drzymala et al filed Oct. 3, 2008 which is incorporated herein by reference. The depictions in the co-pending application show optical layouts which represent one or more fold mirrors that achieve long path lengths within the reader housing. In the Figures two or three fold mirrors are used to define a given field of view. Other numbers of mirrors, however, could be used to direct light to a field of view outside the housing.

Figure 7:
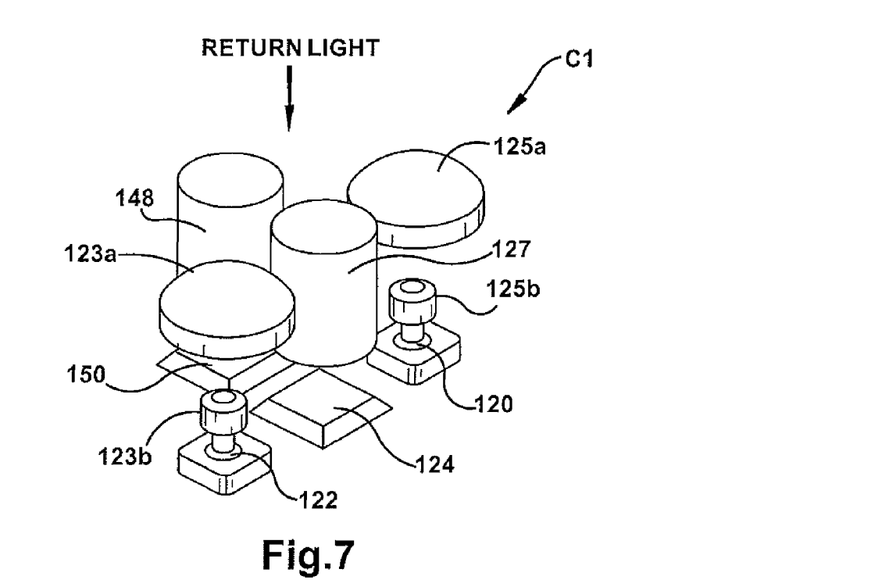
FIG. 7 is a perspective view of an illumination component associated with one camera system of a multi-camera system bar code reader.

Each of the multiple cameras has its own dedicated light source for illuminating that camera's field of view. The light source is only energized when its associated camera is capturing an image. Turning to FIG. 7, one sees a camera assembly C1 having two spaced apart light emitting diodes 120, 122 (Although in the exemplary embodiment, two LEDs are used for each camera, more or less than two could be used) that are closely adjacent to a sensor array 124. The light emitting diodes direct light through associated combination light pipe and lens systems. When a first light emitting diode 120 is energized light passes through a light pipe and two lenses 125a, 125b bounces off the fold mirrors M1A, M1B, M1C so that light is emitted from the housing and directed in a direction to scan a leading surface and bottom surface of an object moving from right to left as the housing is oriented in the figures. Return light from the package passes through a lens 127 and impacts the sensor array 124. A second light emitting diode 122 is energized simultaneously with the first LED 120 and light passes through a light pipe and two lenses 123a, 123b bounces off the same fold mirrors so that light is emitted from the housing and directed in the same direction. Return light originating from this second Led 122 reflects off the object passes through the lens 127 and impacts the same sensor array 124. In the exemplary embodiment the LEDs 120, 122 are spaced from 1 to 1.5 cm from the center of the sensor array 124.

The illumination intensity provided by the diodes 120, 122 is bright enough that the maximum required exposure time is shortened and terminated before the next camera begins to capture an image. Therefore, the first camera C1 will no longer be exposing when the illumination system for the next camera C2 is activated, and the exposure of the first camera will not be affected by the illumination flash of the second camera system. The imagers are exposed in a sequence 140 (FIG. 8), each ending its exposure before the next is energized. When all N imagers (six in the exemplary embodiment) have captured images the sequence repeats. To achieve 60 frames per second from 6 cameras, the 16.66 milliseconds total frame time must be time sliced to 2.77 millisecond camera allocations.

This time slicing allows the cameras C1-C6 to operate at an exposure time that is sufficient, but not much greater than is necessary to produce a decodable image at maximum desired range. At close range, however, this exposure time will be longer than necessary, and may be too long to allow the desired swipe speed due to image blur. It is therefore necessary to reduce the exposure time when barcodes are positioned closer to the scanner, and this reduction must be accomplished without wasting any frames.

A photo-detector sensor 150 (FIG. 7) associated with each camera that uses auto-exposure (in a multiple camera system not all imagers will necessarily need auto-exposure), is positioned such that return light from an associated window field of view corresponds to a portion of the field of view of the image sensor 124. For example, one auto-exposure sensor 150 has a field of view whose light is focused by a lens 148 that is 75% of the size of the field of view of the imager array 124, and which is positioned to be entirely within the field of view of the imager over the majority of the desired working range of the scanner. To assure that the field of view of the sensor 150 falls entirely within the field of view of the sensor 124, the field of view of the auto exposure sensor 150 is tilted a slight amount (<five degrees) so its field of view is approximately centered within the field of view of the sensor 124 within the working range of the camera C1.

When the diodes 120, 122 are energized, the output from the auto-exposure phototdetector or sensor 150 is integrated until the integrator exceeds a threshold value, at which time the diodes 120, 122 are deactivated. One suitable photodetector is commercially available as part no. BPW34 by Osram. A threshold value is set to correspond to the correct exposure level for the sensor 124. The image sensor 124 continues its exposure until its preset exposure time is reached, but since the illumination from the LEDs 120, 122 has been turned off, no significant amount of additional light will be collected.

Use of a global shutter assures that the time during which the sensor 124 is exposing is minimized, so the opportunity for interference from ambient light is far reduced. With a rolling shutter, at least part of the frame may be exposing for as much as 30 ms (the rolling shutter sensor runs at a maximum of 30 frames/second), but the required exposure time, and therefore the duration of the illumination flash may be as little as, for example, 300 us. The image that is captured during the flash of illumination therefore can be corrupted during the remainder of the 30 ms exposure time.

When a sensor 124 with a global shutter is used, the time during which the illumination flash has ended but the sensor is still exposing is only perhaps 100 us, assuming the maximum exposure time has been set to 400 us, so ambient light will have little influence on the ultimate brightness of the image. No optical filter is needed since the influence of ambient light has already been minimized.

The maximum exposure time of the reader 10 is changed based on the light transmission efficiency of the scan window H, V. The light reflected off from the barcodes and received by the imagers can vary due to variations in distance from the scanner or variations in the kind of window that is installed on the scanner. For example scanner windows might be tempered glass which transmits around 90% of incident light. Windows made from glass with a scratch resistant diamond-like coating (DLC) transmits light at a 55% efficiency. The window or windows can include a thin coating of sapphire laminated to a glass substrate which transmit light with 72% efficiency at a wavelength of 630 nm, the wavelength of LED illumination systems used with exemplary cameras. These transmission efficiencies are typical for light passing through a window at 45 degrees, which is common for existing imagers.

If a DLC window is being used, maximum exposure time can be set, for example, to 400 usecs, but when a sapphire window is used maximum time can be set to 250 usecs, since the superior light transmission of the sapphire window will never require a longer exposure time. Reducing the maximum exposure time when a higher transmission window is used minimizes the impact of ambient light, which is transmitted more easily through the higher transmission window, and also avoids increasing the duration of an illumination flash more than necessary when no object is within the field of view, in which case the auto-exposure system will turn the flash duration up to maximum, since no reflected light is detected. Regardless of the maximum exposure time, both the actual shutter exposure time of the sensor and the maximum illumination flash duration will be set to be around the same. The auto-exposure control implemented by the processors can reduce illumination flash duration, but would generally not be allowed to produce a flash whose duration exceeds the maximum exposure duration, since any such prolonged flash is wasted, annoying to the user and needlessly increases power consumption of the scanner.

Figure 6:
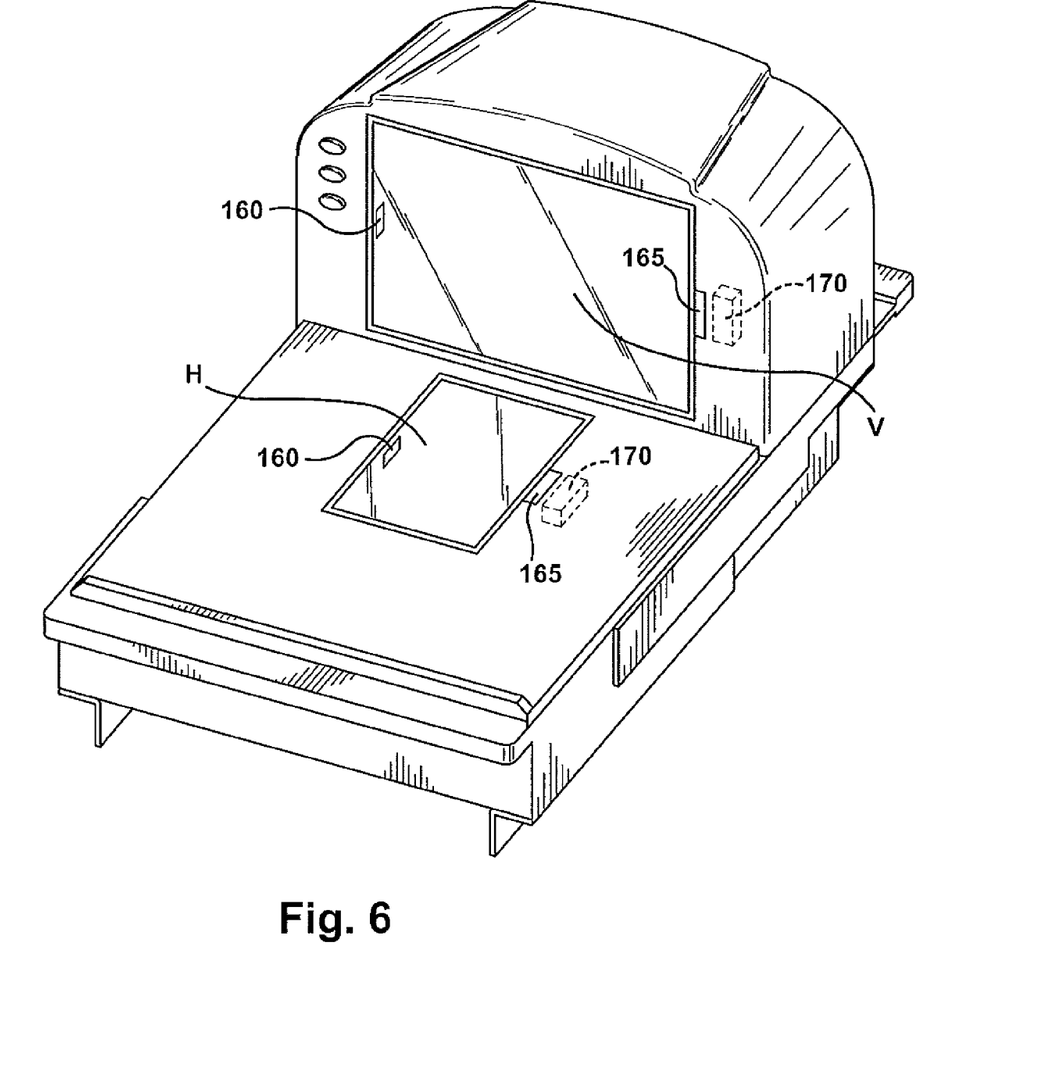
FIG. 6 is a perspective view of an imaging dual window scanner constructed in accordance with another example embodiment of the present disclosure.

In order to utilize different maximum exposure times for different kinds of windows, the scanner must be able to identify which window has been installed. This can be accomplished several ways. A barcode 160 (FIG. 6) can be placed inside the window, or adjacent to the inside of the window where at least one of the cameras can read it. The barcode can identify the kind of window next to which it is positioned, causing the reader to operate at a predetermined maximum exposure time for that window. Alternatively, the barcode can directly indicate what maximum exposure time should be used for that window. Another possibility is to mount a magnet 165 in the frame that holds the window of one kind of window, and not in the window frame of the other kind of window. When a window is installed, a magnetic sensor 170, such as a reed switch or hall-effect sensor can be positioned to detect the magnet. If it doesn't detect a magnet one maximum exposure time is enabled. If it does detect a magnet a different maximum exposure time is selected, installs the window, to set-up the scanner with the appropriate maximum exposure time for that window.

In some multi-camera bar code readers auto-exposure cameras are needed on only a subset of the imagers. As discussed above in the disclosed reader 10, three of the cameras obtain images through the vertical window V and three other cameras obtain images through the horizontal window H. The vertical window V is not subject to the same abuse as the horizontal windows, which must survive even though metal objects such as cans of food and tools will be dragged across it. Therefore scratch resistant window materials such as DLC and Sapphire are not generally used for the vertical window in such bar code readers. Vertical windows can be made, for example, of tempered glass, which has better optical transmission characteristics than either Sapphire or DLC. With this superior optical transmission, it is possible to project enough light to use a very short exposure time even when scanning at maximum range. There is therefore no need to increase exposure time to achieve full range, as is necessary when scanning through windows with lower transmission. Imagers that look through high transmission windows can therefore operate with fixed exposure times, in which the flash duration and sensor shutter exposure time are matched at a preset value. This eliminates the need to implement auto exposure with some of the imagers, reducing system cost.

A bar code reader built in accordance with this invention can therefore use auto exposure on only a subset of the cameras. Alternatively, all imagers can use an auto-exposure system as described above, including the imagers that look through a high transmission window. Providing these imagers with an auto-exposure system will cause them to operate with shorter exposure durations when barcodes are scanned close to the window, as is commonly the case. Shorter exposures increase the scanners ability to capture undistorted images of moving objects, so the addition of the auto-exposure system will increase the allowable swipe speed when barcodes are being scanned at closer then maximum range.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A bar code reader operable to read bar codes comprising:
   a housing including two or more transparent windows and defining a housing interior region enabling a target object swiped or presented in relation to the transparent windows can be evaluated for a presence of a bar code;
   a plurality of cameras supported within the interior region of the housing, each camera having both an image capture sensor global shutter array operable to capture an image of a bar code within an associated camera field of view and a corresponding light source operable to illuminate said field of view associated with said camera; and
   a processing system coupled to the plurality of cameras, the processing system operable to decode a bar code carried by the target object from images captured by the plurality of cameras, said processor sequentially activating the light source of each given camera selected from the plurality of cameras in synchronism with activating an exposure by the image capture sensor array of the each given camera to allocate different time segments within an image frame period to different cameras amongst the plurality of cameras; and
   a sensor operable to automatically determine an optical characteristic of at least one of the two or more transparent windows and wherein the processing system presets a maximum exposure time for the cameras whose field of view extends through said at least one window based on the optical characteristic before automatically adjusting for each of the fields of view, an illumination flash duration operable for activating the corresponding light source, and wherein the bar code reader is operable to decode the bar codes.

2. The bar code reader of claim 1 additionally comprising a plurality of light sensors coupled to the processing system wherein each light sensor monitors a field of view of an associated camera and the processing system adjusts illumination time of the cameras based on sensed light.

3. The bar code reader of claim 2 wherein the light sensor associated with a given camera evaluates an amount of light returning from the camera field of view and the processing system terminates illumination of an associated camera field of view when a threshold amount of light has been sensed.

4. The bar code reader of claim 1 wherein at least some of said plurality of cameras comprise a global shutter having an adjustable exposure time.

5. The bar code reader of claim 4 wherein the adjustable exposure time is adjusted based on a light transmissivity of the material of a window through which light passes on its way to a field of view.

6. The bar code reader of claim 1 comprising a sensor for automatically determining a characteristic of at least one window and wherein the processing system adjusts an exposure time for cameras whose field of view extends through said at least one window based on the characteristic.

7. The bar code reader of claim 1 wherein at least some of said plurality of cameras comprise a global shutter having an adjustable exposure time and said adjustable exposure time is chosen to be less than 500 microseconds based on a working range of the camera.

8. The bar code reader of claim 1 wherein an image frame period is at least 1/30 seconds to provide a video frame rate of 30 frames per second.

9. The bar code reader of claim 1 additionally comprising an indicia for indicating a material of said one or more windows and wherein an exposure time for a sensor array is adjusted based on a material of a window through which light passes on its way to the sensor array.

10. A method for imaging a target bar code comprising:
    providing a housing having two or more transparent windows that define a region for movement of an object having a bar code;
    positioning multiple cameras in the housing wherein each of said multiple cameras includes both an associated sensor array having a global shutter for imaging bar codes on objects outside the housing within an associated field of view and a corresponding light source for illuminating said field of view associated with said camera;
    gathering multiple images from different cameras by:
        exposing a first image from a first camera field of view as light reflected from said field of view impinges onto a first sensor array in synchronism with activating the light source associated with the first camera field of view and
        subsequent to exposing the first image, exposing other images from one or more additional camera fields of view as light reflected from said one or more additional fields of view impinges onto one or more additional sensor arrays in synchronism with activating the light source associated with each of the one or more additional camera fields of view so that the images of the cameras are obtained during a frame period of 1/30 seconds or less;
    interpreting images from the cameras to determine a presence of a bar code and if present decoding the bar code; and automatically determining an optical characteristic of at least one of the two or more transparent windows and presetting a maximum exposure time for the cameras with fields of view extending through said at least one window based on the optical characteristic before automatically adjusting for each of the fields of view, an illumination flash duration activating the corresponding light source, and decoding the bar codes.

11. The method of claim 10 wherein the cameras are adjustable exposure cameras and additionally comprising illuminating an associated field of view for each of the adjustable exposure cameras, sensing light reflected from each associated camera field of view and terminating the illumination for said associated field of view after a threshold amount of light has been reflected from said field of view.

12. The method of claim 10 additionally positioning a plurality of light sensors for monitoring a field of view of an associated camera and adjusting an illumination time based on an amount of light reflected from the camera's field of view.

13. The method of claim 12 wherein an exposure time is adjusted based on material of the window through which light passes on its way to a sensor.

14. The method of claim 11 wherein the housing supports at least some cameras without adjustable exposures and these cameras also obtain images within the frame period.

15. The method of claim 10 comprising a sensor for automatically determining a material of at least one window and wherein the processing system adjusts an exposure time for cameras whose field of view extends through said at least one window based on the material.

16. An imaging system operable to be used in a multi-camera imaging-based bar code reader having a housing supporting a plurality of transparent windows and defining an interior region, a target object being presented near or moved with respect to the plurality of windows operable to image a target bar code on a target object, the imaging system comprising:

a plurality of camera assemblies coupled to an image processing system, each camera assembly of the plurality of camera assemblies being positioned within the housing interior region to define a field of view which is different than a field of view of each other camera assembly of the plurality of camera assemblies, at least some of the camera assemblies including a sensor array having a global shutter operable to adjust camera exposure, a light source in close proximity to the sensor array operable to illuminate a field of view and a light sensor operable to determine an amount of light reflected back to the sensor array;

a plurality of minors for conveying light from a light source to a camera field of view and operable to return light bouncing off a target object back to the sensor array of said camera assembly; and one or more processor operable to control image exposure of the cameras having a global shutter based upon the amount of light reflected to an associated light sensor, a sensor operable to automatically determine an optical characteristic of at least one of the plurality of transparent windows and wherein the processors preset a maximum exposure time for the cameras whose field of view extends through said at least one window based on the optical characteristic before automatically adjusting for each of the fields of view, an illumination flash duration operable for activating the light corresponding light source, and wherein the bar code reader is operable to decode the bar codes.

17. The apparatus of claim 16 wherein the processors determine a window light transmissivity for different camera fields of view pass adjusts exposure based on said window transmissivity those cameras whose exposure can be adjusted.

18. The apparatus of claim 17 wherein the transmissivity is based on a label fixed to the housing within a camera field of view which is interpreted by said one or more processors.

19. The apparatus of claim 16 wherein the one or more processors establish a fixed global shutter exposure time, activate the light source and extinguish the light source based on reflected light sensed by a light sensor from an object within a camera field of view for those cameras including the global shutter.

* * * * *